3,394,396
VINYL CHLORIDE POLYMERS CONTAINING ESTERS OF TARTARIC ACID

George Kletecka, Lakewood, Ohio, assignor to The B. F. Goodrich Company, New York, N.Y., a corporation of New York
No Drawing. Filed July 28, 1966, Ser. No. 568,420
3 Claims. (Cl. 260—31.8)

This invention relates to the prevention of streaking which occurs during extrusion of certain vinyl chloride polymer compounds by incorporating therein small amounts of tartaric acid esters.

Streaking is a serious problem during the extrusion of certain rigid vinyl chloride polymer compounds. This has plagued the industry for many years and usually manifests itself as pink or gray stripes which run in the axial direction of the extrusion and appear on the surface of pipes and other shaped articles. The intensity of the streaking varies with the material extruded, the type of extruder, cylinder, the cylinder and die temperatures and other factors. In some instances, the streaking is not immediately apparent but latent and requires several months to manifest itself. The cause of the streaking is not known, but it is a very real and serious problem.

It is an object of this invention to provide polyvinyl chloride and other vinyl chloride polymer compositions capable of being extruded and which do not streak. Other objects of the present invention will become apparent to those skilled in the art from the following detailed description.

I have now discovered that streak-resistant polyvinyl chloride compositions can be prepared by mixing with the polyvinyl chloride a small amount of a diester of tartaric acid having the formula

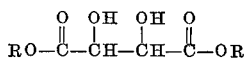

wherein R represents an alkyl group containing from 12 to 24 carbon atoms such as dodecyl (lauryl), tetradecyl (myristyl), hexadecyl (cetyl), heptadecyl, octadecyl (stearyl), nonadecyl, eicosyl and the like. More preferred are the tartrate esters wherein the alkyl group is essentially linear and contains 16 to 20 carbon atoms, with distearyl tartrate being especially preferred. It is not necessary that the two hydrocarbon radicals be identical, they may be different, such as for example, cetyl stearyl tartrate.

Generally, the amount diester employed can be varied between about 0.1 part and about 5 parts per 100 parts by weight of polyvinyl chloride polymer, and most preferably between about 0.4 part and 2.0 parts per 100 parts by weight polyvinyl chloride.

The tartrate diesters may be incorporated into the vinyl chloride polymer by any of the accepted methods well known to the art. Such methods include mixing in a Banbury or other internal mixer or kneader, mixing on a mill, dissolving or suspending the diester in another palsticizer and mixing, dissolving in a volatile solvent followed by evaporation of the solvent and the like. The compounds are readily dispersed in the polyvinyl chloride and there is no difficulty in obtaining the desired intimate mixtures, the net result being a highly efficient utilization of the diester. Furthermore, the tartrate diesters are compatible with plasticizers, lubricants, pigments, stabilizers, processing aids and other modifying materials which are normally incorporated into vinyl chloride polymer molding compositions and have no detrimental effect on the heat and light stability and other useful properties of the polymers.

While this invention is particularly useful for vinyl chloride homopolymers, vinyl chloride copolymers are also useful. These include thermoplastic polymers, which contain vinyl chloride with minor proportions of comonomers having one $CH_2=C<$ group per molecules such as vinylidene chloride, vinyl acetate, methyl acrylate, ethyl acrylate, methyl methacrylate, acrylonitrile, methacrylonitrile, styrene, ethylene, propylene and the like. Preferred are copolymers containing more than 90 or 95 percent vinyl chloride. Also, post-chlorinated polyvinyl chloride having densities in the range between about 1.43 to about 1.65 may be employed.

The diesters useful in this invention are prepared by reacting tartaric acid with the appropriate alcohol. A mixture of alcohols may be used if a mixed ester is desired. The esterification may be conducted according to any of the well known methods employed for the preparation of esters, however, it is generally preferred to reflux the tartaric acid with excess alcohol in the presence of a catalyst such as hydrogen chloride, sulfuric acid, boron fluoride etherate, ethanesulfonic acid, p-toluenesulfonic acid and the like. Aromatic hydrocarbon solvents which form azeotropes with water, such as benzene or toluene, may be employed to remove the water formed during the esterification to insure a good yield of the ester. It is not necessary that the tartrate diester be extremely pure prior to incorporation in the polyvinyl chloride. It is adequate and often desirable to collect the diester by removing a portion of the solvent from the reaction mixture and use the product directly, as it is obtained by filtration.

The following examples set forth data which illustrate and clarify the invention, however, it is not intended that they limit the scope thereof. In these examples all parts are by weight.

A standard rigid polyvinyl chloride composition was prepared according to the following recipe:

| | Parts |
|---|---|
| Polyvinyl chloride | 100 |
| Styrene-acrylonitrile resin [1] | 3 |
| Titanium dioxide (rutile) | 15 |
| Calcium stearate | 1.5 |
| Lubricant | 2 |
| Tin stabilizer [2] | 2 |
| Di-stearyl tartrate | 0–1.0 |

[1] 65–85% bound styrene.
[2] The tin stabilizer may be dibutyl diphenyl tin, dibutyl tin dilaurate, dibutyl tin dilaurylmercaptide, dibutyl tin dimaleate, dibutyl isooctyl thioglycolate tin and the like.

Measured proportions of the above listed ingredients were transferred to a Banbury mixer and after fluxing each batch to a melt temperature of 350° F. were dropped onto a roll plastic mill for a four minute work cycle. The temperature of the stock at the time of drop was about 350° F. The particular mill used had 10″ x 20″ rolls with a 1.224:1 roll ratio and were set so that a 0.045″ roll clearance was maintained. At the end of the four minute work cycle, a smooth rolling bank was obtained. Mill stock temperatures ranged from about 345° F. to about 360° F. The rolls were then opened slightly and the sheet removed from the roll. Samples were cut from the sheet and used to determine the polymer physical properties. Tensile strengths were determined by ASTM test method D638–60T, the Izod impact resistance measured according to ASTM method D256–56, and ASTM method D648–56 used to determine the heat distortion or deflection temperature. Water absorption was measured by immersing in boiling water for 24 hours.

The polyvinyl chloride composition containing 0.5 parts di-stearyl tartrate had a tensile strength of 6610 p.s.i., an Izod impact of 1.65 ft. lbs., a heat distortion temperature of 163° F. and 1.49% water absorption. These data demonstrate that the effect of the di-stearyl tartrate on the physical properties of the polyvinyl chloride is quite acceptable. Typically, a tensile strength of about 5000 p.s.i. is considered more than adequate for rigid plastic articles. Similarly, polyvinyl chloride compositions containing higher loadings of di-stearyl tartrate also retained their useful properties.

The physical appearance and the performance of the mixture during the Banburying and the milling operations demonstrate its relative ease of processability. It is evident from the length of time required to form a band on the roll and the smooth rolling feed bank developed between the rolls, as well as the outward appearance and uniformity of the sheet, that the processability is quite acceptable.

The polyvinyl chloride compounds were granulated and extruded into ¾″ diameter pipe to further demonstrate the relative ease of processability of the compositions of this invention as well as the ability of these compounds to resist streaking. Stock temperatures were maintained at about 390° F. throughout the extrusion. The table set forth below, tabulates the data obtained from one such extrusion.

TABLE

| | | |
|---|---|---|
| Distearyl tartrate (part) | 0 | 0.5 |
| Stock temperatures (° F.) | 390 | 385 |
| Out-put rate: | | |
| Grams/minute | 155 | 155 |
| Inches/minute | 40 | 41 |
| Swell value (grams/inch) | 3.88 | 3.73 |
| Extrudate appearance | (¹) | (²) |

¹ Smooth and glossy with streaks.
² Smooth and glossy with no streaking.

The data show that the tendency to streak has been eliminated without adversely changing other important extrusion characteristics. No streaks developed in the extruded articles containing the tartrate after being stored for several months. Extrusions made at higher loadings of di-stearyl tartrate were equally effective in the prevention of extrudate streaking with the added advantages of higher output rates. The data clearly demonstrate the polyvinyl chloride compositions of this invention can extruded without the development of unsightly streaking and without destroying the useful properties of the polymer.

Heat stabilities of these polyvinyl chloride compositions are also more than adequate. This observation was made by subjecting samples of the polymers to a temperature of about 375° F. in an air-circulating oven. Visual observations are made at regular intervals and the degree of polymer degradation with time is recorded and compared with a set of standards having acceptable heat stabilization. The compositions of this invention withstand the extreme effects of this test up to about 45 minutes.

The vinyl chloride polymers useful in this invention may be prepared by any of the processes well known in the art. Such methods include polymerizations in aqueous emulsions, in solution, both solvent and nonsolvent, and in bulk. Also, any of the well known polymerization catalysts may be used.

The vinyl chloride polymer compositions containing the tartaric acid ester are particularly useful for compression and injection molding and extrusion into pipe and tubing, house siding, sheet and the like.

I claim:
1. A composition comprising a vinyl chloride polymer selected from the group consisting of chlorinated polyvinyl chloride, homopolymers of vinyl chloride, and copolymers of vinyl chloride with an ethylenically unsaturated monomer copolymerizable therewith in which the vinyl chloride constitutes a major proportion of the copolymer and from about 0.1 part to about 5 parts by weight per 100 parts of said polymer of a diester of tartaric acid having the formula

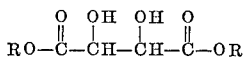

wherein R is an alkyl radical containing from 12 to 24 carbon atoms.

2. The composition of claim 1 wherein the vinyl chloride polymer is polyvinyl chloride and R is a linear alkyl radical containing from 16 to 20 carbon atoms.

3. The composition of claim 2 wherein the diester of tartaric acid is di-stearyl tartrate present in amounts from about 0.48–2.0 parts.

References Cited
UNITED STATES PATENTS 1,993,736    3/1935    Graves et al.
2,122,716    7/1938    Graves.
3,031,491    4/1962    Dobson et al.

MORRIS LIEBERMAN, *Primary Examiner.*
L. T. JACOBS, *Assistant Examiner.*